United States Patent
Okamoto

(10) Patent No.: US 10,726,994 B2
(45) Date of Patent: Jul. 28, 2020

(54) MULTILAYER CERAMIC CAPACITOR

(71) Applicant: Murata Manufacturing Co., Ltd., Nagaokakyo-shi, Kyoto-fu (JP)

(72) Inventor: Takafumi Okamoto, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 16/167,665

(22) Filed: Oct. 23, 2018

(65) Prior Publication Data
US 2019/0057813 A1    Feb. 21, 2019

Related U.S. Application Data

(63) Continuation of application No. PCT/JP2017/020003, filed on May 30, 2017.

(30) Foreign Application Priority Data

Jun. 6, 2016   (JP) .................. 2016-112613

(51) Int. Cl.
*H01G 4/30*    (2006.01)
*H01G 4/12*    (2006.01)
(Continued)

(52) U.S. Cl.
CPC ............ *H01G 4/1245* (2013.01); *H01G 4/12* (2013.01); *H01G 4/1227* (2013.01);
(Continued)

(58) Field of Classification Search
CPC ...... H01G 4/1245; H01G 4/1227; H01G 4/12; H01G 4/248; H01G 4/30; H01G 4/012
See application file for complete search history.

(56) References Cited

U.S. PATENT DOCUMENTS 6,917,513 B1    7/2005  Kim et al.
7,751,178 B2 *  7/2010  Suzuki ................ C01G 23/002
                                              361/311
(Continued)

FOREIGN PATENT DOCUMENTS

JP    S5567567 A       5/1980
JP    H04312907 A     11/1992
(Continued)

OTHER PUBLICATIONS

International Search Report issued for PCT/JP2017/020003, datd Aug. 22, 2017.
(Continued)

*Primary Examiner* — Noah S Wiese
(74) *Attorney, Agent, or Firm* — Arent Fox LLP

(57) ABSTRACT

A multilayer ceramic capacitor having a ceramic sintered body with alternately laminated dielectric layers and internal electrodes. The dielectric layers are formed from a perovskite-type compound represented by the general formula $ABO_3$, and the perovskite-type compound contains at least Ti and a volatile element that forms a solid solution at a B site thereof. The internal electrodes are formed from a base metal material and contain the volatile element. The content of the volatile element is greater than 0 parts by mole and less than or equal to 0.2 parts by mole with respect to 100 parts by mole of the constituent element at the B site, and excluding the volatile element at the B site.

20 Claims, 2 Drawing Sheets

(51) Int. Cl.
*H01G 4/248* (2006.01)
*H01G 4/012* (2006.01)

(52) U.S. Cl.
CPC ............... *H01G 4/248* (2013.01); *H01G 4/30* (2013.01); *H01G 4/012* (2013.01)

(56) References Cited

U.S. PATENT DOCUMENTS

| | | | |
|---|---|---|---|
| 8,102,639 B2 | 1/2012 | Kasuya et al. | |
| 8,767,373 B2* | 7/2014 | Furukawa | H01G 7/04 361/277 |
| 2004/0121153 A1* | 6/2004 | Venigalla | B82Y 30/00 428/386 |
| 2009/0067117 A1 | 3/2009 | Kasuya et al. | |
| 2013/0065065 A1* | 3/2013 | Nakajima | C03C 17/001 428/432 |
| 2013/0321980 A1 | 12/2013 | Suzuki | |
| 2016/0181017 A1* | 6/2016 | Kamigaki | C08K 3/00 174/260 |

FOREIGN PATENT DOCUMENTS

| | | |
|---|---|---|
| JP | H05335176 A | 12/1993 |
| JP | H09246084 A | 9/1997 |
| JP | H10139405 A | 5/1998 |
| JP | H11134941 A | 5/1999 |
| JP | 2009032837 A | 2/2009 |
| JP | 2012046372 A | 3/2012 |
| KR | 20050100427 A | 10/2005 |
| KR | 20130115357 | 10/2013 |
| WO | 2010098033 A1 | 9/2010 |

OTHER PUBLICATIONS

Written Opinion from the International Searching Authority issued for PCT/JP2017/020003, dated Aug. 22, 2017.

* cited by examiner

MULTILAYER CERAMIC CAPACITOR

CROSS REFERENCE TO RELATED APPLICATIONS

The present application is a continuation of International application No. PCT/JP2017/020003, filed May 30, 2017, which claims priority to Japanese Patent Application No. 2016-112613, filed Jun. 6, 2016, the entire contents of each of which are incorporated herein by reference.

FIELD OF THE INVENTION

The present invention relates to a multilayer ceramic capacitor, and more particularly to a multilayer ceramic capacitor that has a dielectric layer formed from a perovskite type compound and an internal electrode formed from a base metal material.

BACKGROUND OF THE INVENTION

In recent years, multilayer ceramic capacitors have been mounted in various electronic devices. Further, as a dielectric material for use in this type of multilayer ceramic capacitor, conventionally, $BaTiO_3$-based compounds capable of acquiring a high dielectric constant have been widely used. In addition, a base metal material such as Ni which has electric conductivity and has a low cost has been widely used as an internal electrode material for the multilayer ceramic capacitor.

For example, PTL 1 proposes a barium titanate-based dielectric magnetic composition represented by the composition formula of $\{(Ba_{1-x-y}Ca_xBr_y)O\}_m \cdot TiO_2$ (where m, x, and y satisfy $1.005 \leq m \leq 1.03$, $0.02 \leq x \leq 0.22$, and $0.05 \leq y \leq 0.35$).

According to PTL 1, a multilayer ceramic capacitor that has an insulation resistance IR of greater than or equal to $10^5$ MΩ·cm and a dielectric constant c of greater than or equal to 5000 is obtained by partially substituting Ba with each of Ca and Br, and determining the m value (=A/B) of the perovskite compound represented by the general formula $A_mBO_3$ so as to be A-site rich, and carrying out firing in a reducing atmosphere where the internal electrode material is not oxidized.

PTL 1: Japanese Patent Laying-Open No. 55-67567 (claim 1, Table 1 on page 3, etc.)

SUMMARY OF THE INVENTION

However, according to PTL 1, although an insulation resistance greater than or equal to $10^5$ MΩ·cm can be ensured at the initial stage of driving, there has been a problem that continuous driving for a long period of time at a high temperature decreases the insulation resistance, thereby causing degradation of insulation performance, and thus failing to ensure sufficient reliability.

More specifically, it is known that when a dielectric material that has a perovskite-type crystal structure such as a $BaTiO_3$-based compound is subjected to firing in a reducing atmosphere, oxygen defects are generated in the crystal lattice. Further, such oxygen defects move and then diffuse within the crystal grains during driving, and there has thus been a problem that continuous driving for a long period of time at a high temperature degrades the insulation performance over time, leading to a decrease in high-temperature load lifetime, and thereby failing to ensure sufficient reliability.

The present invention has been made in view of the foregoing circumstances, and an object of the present invention is to provide a multilayer ceramic capacitor which can suppress degradation of insulation performance over time, and thus ensure favorable reliability, even when dielectric layers are formed from a perovskite-type compound, and when internal electrodes are formed from a base metal material.

For a multilayer ceramic capacitor, typically, a dielectric material and an internal electrode material are subjected to co-firing to prepare a ceramic sintered body.

In this regard, in the case of forming the internal electrode from a base metal material, it is necessary to perform a firing treatment in a reducing atmosphere where the base metal material is not oxidized as in PTL 1.

On the other hand, it is known that when a ceramic material that has a perovskite-type crystal structure (general formula $ABO_3$) such as $BaTiO_3$ is subjected to firing in a reducing atmosphere, oxygen defects (oxygen vacancies) are generated in the crystal lattice. Further, such oxygen defects move and then diffuse in the crystal grains during driving, which leads to degradation of insulation performance over time. Therefore, it is necessary to suppress the diffusion of oxygen defects in order to suppress the degradation of the insulation performance over time to improve reliability.

In order to suppress the diffusion of oxygen defects, it is considered effective to form a vacancy at the B site with coordinated Ti.

However, merely reducing the molar content of Ti with respect to the molar content of the A site element constituting the A site causes the sintered body to lack denseness, even when a vacancy is generated at the B site, and it is difficult to offer desired dielectric properties.

Therefore, the inventor has conducted intensive studies by preparing a ceramic raw material in which a volatile element forms a solid solution at the B site of a Ti-containing perovskite-type compound, alternately laminating the ceramic raw material and an internal electrode material of a base metal such as Ni, and co-firing the materials under a reducing atmosphere to prepare a ceramic sintered body. As a result, it has been found that the volatile element volatilized in the firing treatment under the reducing atmosphere is adjusted to fall within a predetermined range in the ceramic sintered body, and included in the internal electrodes so that the volatile element is partially fixed on the internal electrodes, thereby making it possible to suppress degradation of the insulation performance over time, and thus improve the reliability.

The present invention has been made on the basis of the foregoing finding, and the multilayer ceramic capacitor according to an aspect of the present invention includes a ceramic sintered body with dielectric layers and internal electrodes alternately laminated, wherein a main constituent of each of the dielectric layers is formed from a perovskite-type compound represented by the general formula $ABO_3$, and the perovskite-type compound contains at least Ti and a volatile element that forms a solid solution at a B site, each of the internal electrodes is formed from a base metal material containing the volatile element, and in the ceramic sintered body, a content of the volatile element is greater than 0 parts by mole and less than or equal to 0.2 parts by mole with respect to 100 parts by mole of a constituent element at the B site, excluding the volatile element.

In addition, in the multilayer ceramic capacitor according to an aspect of the present invention, a ratio of a constituent element at an A site to the constituent element at the B site excluding the volatile element is preferably 1.00 to 1.04 in terms of molar ratio.

In addition, in the multilayer ceramic capacitor according to the present invention, the volatile element preferably contains at least one element selected from Zn, Sn, Sb, and In.

In addition, in the multilayer ceramic capacitor according to the present invention, the A site element preferably contains at least one element selected from Ba, Ca, and Sr.

Furthermore, the multilayer ceramic capacitor according to the present invention also preferably contains therein at least one element selected from a rare earth element, a transition metal element, and Si as an accessory constituent.

In addition, in the multilayer ceramic capacitor according to the present invention, the rare earth element is preferably at least one element selected from Gd, Dy, and Y.

Furthermore, in the multilayer ceramic capacitor according to the present invention, the transition metal element is preferably at least one element selected from Mg, Al, Mn, Cu, and V.

In the multilayer ceramic capacitor according to the present invention, diffusion of oxygen defects is suppressed by volatilization of the volatile element that forms a solid solution at the B site, and the volatile element is partially fixed to the internal electrodes because the internal electrodes contains the volatile element, and the insulation is thus enhanced at the interfaces between the dielectric layers and the internal electrodes.

More specifically, according to the present invention, the suppressed diffusion of oxygen defects and the enhanced insulation at the interfaces between the dielectric layers and the internal electrodes act synergistically to improve the insulation performance, thereby making it possible to achieve a multilayer ceramic capacitor with favorable reliability in which the degradation of insulation performance over time is suppressed even in the case of continuous driving at a high temperature for a long period of time.

DETAILED DESCRIPTION OF THE PREFERRED EMBODIMENTS

Next, embodiments of the present invention will be described in detail.

Figure 1:
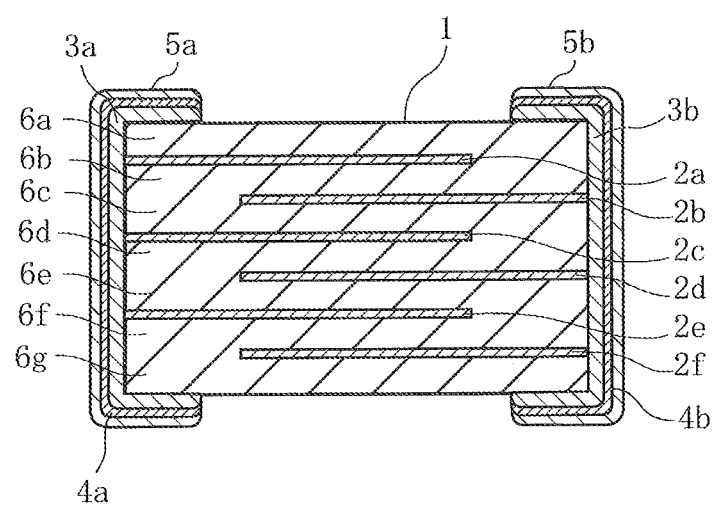
FIG. 1 is a longitudinal sectional view illustrating an embodiment of a multilayer ceramic capacitor according to the present invention.

FIG. 1 is a longitudinal sectional view schematically illustrating an embodiment of a multilayer ceramic capacitor according to an aspect of the present invention.

For the multilayer ceramic capacitor, internal electrodes 2a to 2f are buried in a ceramic sintered body 1, external electrodes 3a, 3b are formed at both ends of ceramic sintered body 1, and furthermore, first plating films 4a, 4b and second plating films 5a and 5b are formed on the surfaces of the external electrodes 3a, 3b.

More specifically, ceramic sintered body 1 has dielectric layers 6a to 6g and internal electrodes 2a to 2f alternately laminated and subjected to firing, and internal electrodes 2a, 2c, 2e are electrically connected to the external electrode 3a, whereas internal electrodes 2b, 2d, 2f are electrically connected to the external electrode 3b. Further, electrostatic capacitance is formed between the facing surfaces of internal electrodes 2a, 2c, 2e and internal electrodes 2b, 2d, 2f.

Specifically, dielectric layers 6a to 6g has a main constituent formed from a perovskite-type compound represented by the general formula $ABO_3$. This perovskite-type compound contains at least Ti and a volatile element E that forms a solid solution at a B site.

In addition, internal electrodes 2a to 2f are formed from a base metal material containing the volatile element E. Further, the content of the volatile element E in ceramic sintered body 1 composed of dielectric layers 6a to 6g and internal electrodes 2a to 2f is adapted to be greater than 0 parts by mole and less than or equal to 0.2 parts by mole with respect to 100 parts by mole of the constituent element (B-E) at the B site, excluding the volatile element E. This makes it possible to suppress degradation of the insulation performance over time even in the case of continuous driving at high temperature for a long period of time, thereby favorable reliability to be ensured.

More specifically, in the case of using a base metal material such as Ni for the internal electrode material of the multilayer ceramic capacitor, there is a need for firing in a reducing atmosphere such that the internal electrode material is not oxidized, when the internal electrode material and dielectric green sheet are subjected to co-firing.

However, as mentioned hereinabove, when a perovskite-type compound containing Ti is subjected to firing in a reducing atmosphere, a defect is generated at an oxygen coordination site in the crystal lattice, thereby generating an oxygen defect. Then, this oxygen defect diffuses into the crystal grains, and there is thus a possibility that continuous driving at high temperature for a long period of time will lead to degradation of the insulation performance over time, thereby causing damage to reliability.

On the other hand, in order to suppress the diffusion of oxygen defects, it is considered effective to form a vacancy at the B site with coordinated Ti. However, merely reducing the molar content of Ti with respect to the molar content of the A site element makes the A site rich with respect to the stoichiometric composition, even when a vacancy is generated at the B site. There is thus a possibility that the ceramic sintering the body 1 may lack denseness, and it is difficult to offer desired dielectric properties.

Therefore, the inventor has conducted intensive studies to prepare a ceramic raw material in which a volatile element forms a solid solution at the B site of a Ti-containing perovskite-type compound, alternately laminate the ceramic raw material and an internal electrode material of a base metal such as Ni, and makes the materials co-fired while adjusting a reducing atmosphere, thereby preparing a ceramic sintered body. As a result, it has been found that with the volatile element volatilized within a predetermined range in the ceramic sintered body and the volatile element partially fixed to the internal electrode, the degradation of the insulation performance over time can be suppressed, thereby improving the reliability. The reason therefor is presumed as follows.

When the ceramic raw material containing the volatile element that forms a solid solution at the B site is subjected to a firing treatment in a reducing atmosphere to volatilize the volatile element E, vacancies (B-site vacancies) are considered to be formed at locations where the volatile element E is volatilized. On the other hand, the B site vacancies act to suppress the movement/diffusion of the oxygen defects formed by the firing treatment under a reducing atmosphere as described above. Therefore, the volatile element E is volatilized by the firing treatment to form B site vacancies, thereby making it possible to suppress movement/diffusion of the oxygen defects.

Furthermore, when the reducing atmosphere is adjusted to perform the sintering treatment on a stronger reduction side, the volatile element E in the ceramic raw material effectively diffuses to internal electrodes $2a$ to $2f$. As a result, the volatile element E is contained in internal electrodes $2a$ to $2f$, and the volatile element E is partially fixed to internal electrodes $2a$ to $2g$. Then, the insulation at the interfaces between dielectric layers $6a$ to $6g$ and internal electrodes $2a$ to $2f$ is enhanced as a result of the volatile element E partially fixed to internal electrodes $2a$ to $2g$.

More specifically, when the content of the volatile element E in ceramic sintered body 1 is defined within the predetermined range, and when the volatile element E is partially fixed to internal electrodes $2a$ to $2f$ so that internal electrodes $2a$ to $2f$ contain therein the volatile element E, the suppressed diffusion of oxygen defects and the enhanced insulation at the interfaces between the dielectric layers and the internal electrodes are considered to act synergistically to improve the insulation performance, thereby making it possible to suppress deterioration of the insulation performance over time even in the case of continuous driving for a long period of time at a temperature of higher than or equal to 150° C., and thus allowing for improved reliability.

It is to be noted that in order to diffuse the volatile element E in the perovskite-type compound toward internal electrodes $2a$ to $2f$ and partially fix the volatile element E to the surfaces of internal electrodes $2a$ to $2f$, it is preferable to adjust the firing atmosphere on a stronger reduction side as described above, for example, it is preferable to perform the firing treatment with the oxygen partial pressure set from $10^{-12}$ to $10^{-13}$ MPa under the reducing atmosphere.

The content of the volatile element E in ceramic sintered body 1 may be arbitrarily determined, as long as the volatile element E volatilizes to produce B site vacancies. However, when the content of the volatile element E in ceramic sintered body 1 exceeds 0.2 parts by mole with respect to 100 parts by mole of the B site element (B-E) excluding the volatile element E at the B site, the volatile element E remains excessively at the B site even when the volatile element E is fixed on the surfaces of $2a$ to $2f$, thus failing to form a sufficient volume of B site vacancies in the crystal structure, failing to adequately suppress movement/diffusion of oxygen defects, and for this reason, failing to achieve an adequate high-temperature load lifetime, and making it difficult to ensure desired reliability.

Therefore, according to the present embodiment, the content of the volatile element E is adapted to be greater than 0 parts by mole and less than or equal to 0.2 parts by mole with respect to 100 parts by mole of the B site element (B-E) excluding the volatile element E at the B site.

It is to be noted that even in the case where dielectric layers $6a$ to $6g$ contain therein the volatile element E, when the volatile element E is present as a solid solution at the A site, or contained merely as an accessory constituent and present at the crystal grain boundary, it is not possible to solve the problem of the present invention even when the volatile element E volatilizes. More specifically, in this case, it is considered that it is not possible to form any B site vacancy that have the function of suppressing the diffusion of oxygen defects when the volatile element E is not present as a solid solution at the B site. Therefore, according to the present invention, it is essential for the volatile element E to be present as a solid solution at the B site within the above-mentioned range.

Such volatile element E is not to be considered particularly limited as long as the volatile element E has volatility and forms a solid solution at the B site in the form of partially substituting Ti, but it is preferable to use at least one selected from among elements that are low in melting point, close in ionic radius to Ti, and easily substituted for Ti, for example, Zn, Sn, Sb, and In, and among these elements, inexpensive Zn is particularly preferably used.

In addition, the constituent element at the A site of the perovskite-type compound is also not particularly limited as long as the element forms the main element of the ceramic material, but it is preferable to use at least one selected from Ba, Ca, and Sr, and among these elements, Ba which offers a particularly favorable dielectric property can be most preferably used.

In addition, the B site element constituting the B site has only to contain at least Ti and the volatile element as described above, and if necessary, may contain therein Zr that is a tetravalent element.

Therefore, examples of the perovskite-type compound can include, when the volatile element is expressed by E, $Ba(Ti,E)O_3$, $Ba(Ti,Zr,E)O_3$, $(Ba,Sr,Ca)(Ti,E)O_3$, and $(Ba,Ca,Sr)(Ti,Zr,E)O_3$.

In addition, the constituent material of the internal electrode is not to be considered particularly limited as long as the material is a base metal material containing at least the volatile element E (e.g., Zn), and Ni, Cu, or alloys such as a Ni alloy or a Cu alloy containing Ni or Cu as a main constituent can be used as the base metal material.

It is to be noted that although the stoichiometric ratio (A/B ratio) of the A site element of the perovskite-type compound to the B site element is 1.000, the stoichiometric ratio is not to be considered limited to 1.000.

However, when the ratio of the A site element to the B site element excluding the volatile element, that is, the A/(B-E) ratio is less than 1.00, the A site element is reduced, and there is thus a possibility of making it impossible to achieve high reliability even when the volatile element E volatilizes.

On the other hand, when the A/(B-E) ratio exceeds 1.04, the A site is excessively rich, which can lead to decreased sinterability.

Therefore, the A/(B-E) ratio is preferably greater than or equal to 1.00 and less than or equal to 1.04.

Further, dielectric layers $6a$ to $6g$ have only to have a main constituent (for example, greater than 50 wt %, preferably greater than or equal to 80 wt %, more preferably greater than or equal to 90 wt %) formed from the perovskite compound mentioned above, and without affecting the property, it is also preferable to contain rare-earth elements, transition metal elements, various types of accessory constituents such as Si, Cl, and P, if necessary. For example, Gd, Dy, Y, and the like can be used as the rare-earth elements, and Mg, Al, Mn, Cu, V, and the like can be used as the transition metal elements.

It is to be noted that it is not preferable to form solid solutions of these rare-earth elements and transition metal elements in the main constituent. For example, in the case of forming a solid solution of the rare-earth element in the main constituent, there is a need for an acceptor element such as Mg to be, together with the rare-earth element, present as a solid solution in the main constituent in order to secure reduction resistance. However, since Mg has high ionicity with respect to Ti, forming a solid solution of Mg in the main constituent lowers the Curie point, thereby possibly leading to a decrease in relative permittivity at high temperature, which is not preferable.

Next, the method for manufacturing the multilayer ceramic capacitor will be described in detail.

First, ceramic raw materials are prepared, such as a Ba compound, a Ti compound, and a volatile compound containing a volatile element. Then, these ceramic raw materials are weighed in predetermined amounts, the weighed materials are put in a ball mill together with a grinding medium such as PSZ (Partially Stabilized Zirconia) balls and pure water, subjected to sufficient wet mixing and grinding, dried, and then subjected to a calcination treatment at a temperature of 900 to 1100° C. for a predetermined period of time for synthesis, thereby preparing a main constituent powder.

Next, if necessary, accessory constituent such as rare-earth compounds, transition metal compounds, and Si compounds are prepared, and weighed in predetermined amounts. Then, these weighed compounds are put into a ball mill together with the main constituent powder, a grinding medium, and pure water, subjected to sufficient wet mixing and grinding, mixed, and subjected to a drying treatment to prepare a ceramic raw material powder.

Then, the ceramic raw material powder mentioned above is put into a ball mill together with an organic binder, an organic solvent, and a grinding medium, and subjected to wet mixing to prepare a ceramic slurry, and the ceramic slurry is subjected to molding by a lip method, a doctor blade method, or the like, thereby preparing ceramic green sheets so that thickness after firing reaches about 2 μm or less.

Then, prepared is a conductive paste for internal electrodes, containing, as a main constituent, a base metal material such as Ni. Then, screen printing is applied onto the ceramic green sheets with the use of the conductive paste for internal electrodes, thereby forming a conductive film in a predetermined pattern on the surfaces of the ceramic green sheets.

Then, the multiple ceramic green sheets with the conductive film formed are stacked in a predetermined direction, the ceramic sheet with no conductive film formed is placed as an uppermost layer, and the stacked sheets are subjected to pressure bonding, and cut into a predetermined size to prepare a ceramic laminated body.

Thereafter, the ceramic laminated body is subjected to a heat treatment at a temperature of 250 to 350° C. under the air atmosphere, thereby burning and removing the binder, and then subjected to a firing treatment under a strongly reducing atmosphere composed of a $H_2$—$N_2$—$H_2O$ gas (for example, with an oxygen partial pressure of $10^{-11}$ to $10^{-13}$ MPa) at a firing temperature of 1200 to 1300° C. for about 2 hours. Thus, the conductive films and the ceramic green sheets are subjected to co-sintering to obtain ceramic sintered body 1 with internal electrodes 2a to 2f buried therein. Then, this firing treatment appropriately volatilizes the volatile element E, and diffuses the volatile element E toward internal electrodes 2a to 2f. As a result, the volatile element E is partially fixed to internal electrodes 2a to 2f. More specifically, ceramic sintered body 1 can be obtained in which internal electrodes 2a to 2f contain therein the volatile element E, and the content of the volatile element E is greater than 0 and less than or equal to 0.2 parts by mole with respect to 100 parts by mole of the B site element (B-E) excluding the volatile element E at the B site.

It is to be noted that the volatilization amount of the volatile element E is not to be considered particularly limited as long as the content of the volatile element E satisfies the above-mentioned range in ceramic sintered body 1.

Next, a conductive paste for external electrodes is applied to both end surfaces of ceramic sintered body 1, and subjected to a baking treatment at a temperature of 600 to 800° C., thereby forming the external electrodes 3a, 3b.

It is to be noted that the conductive material contained in the conductive paste for external electrodes is also not to be considered particularly limited, but from the viewpoint of cost reduction, it is preferable to use a material containing Ag, Cu, or an alloy thereof as a main constituent.

In addition, as a method for forming the external electrodes 3a, 3b, the conductive paste for external electrodes may be applied to the both end surfaces of the laminate molded body, and then subjected to the firing treatment simultaneously with the laminate molded body.

Then, finally, first plating films 4a, 4b made of Ni, Cu, a Ni—Cu alloy, or the like are formed on the surfaces of external electrodes 3a, 3b by performing electrolytic plating, and second plating films 5a, 5b made of a solder, tin, or the like are further formed on the surfaces of first plating films 4a, 4b, thereby manufacturing a multilayer ceramic capacitor.

It is to be noted that the present invention is not to be considered limited to the embodiment mentioned above. For example, for the ceramic raw materials such as a Ba compound and a Ti compound, carbonates, oxides, nitrates, hydroxides, organic acid salts, alkoxides, chelate compounds, and the like can also be selected appropriately depending on the form of the synthesis reaction.

In addition, the synthesis method for the main component powder is not limited to the above-mentioned solid phase method, and a synthesis method such as coprecipitation method, a hydrothermal method, and an oxalic acid method may be used.

Next, an example of the present invention will be specifically described.

EXAMPLE

[Preparation of Sample]

$BaCO_3$, $TiO_2$, and ZnO were prepared as the ceramic raw materials, and these ceramic raw materials were weighed such that the content (part by mole) of Zn with respect to 100 parts by mole of Ti and the molar ratio of Ba to Ti (hereinafter referred to as a "Ba/Ti ratio") were obtained as in Table 1 after synthesis. Then, these weighed materials were put into a ball mill together with PSZ balls and pure water, subjected to sufficient wet mixing and grinding, dried, and then subjected to calcination in the air atmosphere at a temperature of 900 to 1100° C. for about 2 hours, thereby preparing a constituent powder.

Next, $Dy_2O_3$, MgO, $MnCO_3$, and $SiO_2$ were prepared as accessory constituent powders. Then, these accessory constituent powders were weighed so that the contents of the accessory component powders were 1.5 parts by mole of $Dy_2O3$, 0.75 parts by mole of MgO, 1 part by mole of $MnCO_3$, and 1.5 parts by mole of $SiO_2$ with respect to 100 parts by mole of Ti, subjected to wet mixing in a ball mill, and then subjected to a drying treatment to obtain ceramic raw material powders of sample numbers 1 to 13.

The ceramic raw material powders of sample numbers 1 to 13 were subjected to composition analysis by an ICP-AES method (high-frequency inductively-coupled plasma emission spectrometry) and an XRF method (X-ray fluorescence method), for calculating the Zn (part by mole) after synthesis with respect to 100 parts by mole of Ti, and the Ba/Ti ratio. As a result, the same as the weighed composition has been confirmed.

Subsequently, the ceramic raw material powder mentioned above was put into a ball mill together with ethanol, a polyvinyl butyral-based binder, a plasticizer, and PSZ balls, and subjected to wet mixing, thereby preparing a ceramic slurry. Subsequently, the ceramic slurry was molded by a doctor blade method so that the thickness after firing was 2.0 μm, thereby preparing ceramic green sheets.

Next, a conductive paste for internal electrodes, containing a Ni powder as a main constituent, was prepared. Then, screen printing was applied onto the ceramic green sheets with the use of the conductive paste for internal electrodes, thereby forming a conductive film in a predetermined pattern on the surfaces of the ceramic green sheets.

Then, the ceramic green sheets with the conductive film formed were stacked for a predetermined number of ceramic green sheets, the ceramic green sheet with no conductive film formed was placed as an uppermost layer, and the stacked sheets are subjected to pressure bonding, and cut into a predetermined size to prepare a ceramic laminated body. Thereafter, a binder removal treatment was performed by heating at a temperature of 350° C. for 3 hours under the air atmosphere, and then, under a reducing atmosphere composed of a $H_2$—$N_2$—$H_2O$ gas with an oxygen partial pressure controlled to $10^{-9}$ to $10^{-13}$ MPa, a firing treatment was performed at 1200 to 1250° C. for 2 hours, thereby making the conductive films and the ceramic green sheets co-sintered, and providing a ceramic sintered body with dielectric layers and internal electrodes laminated alternately.

Next, a conductive paste for external electrodes, containing a Cu powder and glass frit, was applied to both end surfaces of the ceramic sintered body, and subjected to a baking treatment at a temperature of 800° C. under a nitrogen atmosphere to form external electrodes, thereby preparing respective samples of sample numbers 1 to 13.

For each of the samples obtained, the thickness of the dielectric layer was 2.0 μm, the thickness of the internal electrode was 0.6 μm, the external dimensions were length L of 3.2 mm, width W of 1.6 mm, and thickness T of 0.62 mm, the area of the electrode opposed per dielectric layer was 2.5 $mm^2$, and the effective number of dielectric layers laminated was 200.

[Evaluation of Sample]

For each of the samples of sample numbers 1 to 13, the ceramic sintered body was subjected to structure analysis by an XRD method (X-ray diffraction method), and it has been confirmed that the main constituents each have a $BaTiO_3$-based perovskite-type crystal structure.

In addition, for each of the samples of sample Numbers 1 to 13, the Ba/Ti ratio in the dielectric layer was measured with the use of an XRF method, and the same as the ceramic raw material powder for the synthesis has been confirmed.

In addition, for each of the samples of sample numbers 1 to 13, the ceramic sintered body was dissolved, and analyzed by ICP-AES, thereby measuring the content of Zn with respect to 100 parts by mole of Ti in the ceramic sintered body.

Next, with the use of a WDX (wavelength dispersive X-ray analyzer), the ceramic sintered body was subjected to mapping analysis of Zn and Ni in multiple regions, thereby checking whether the Zn component was detected in the internal electrode or not.

Figure 2:
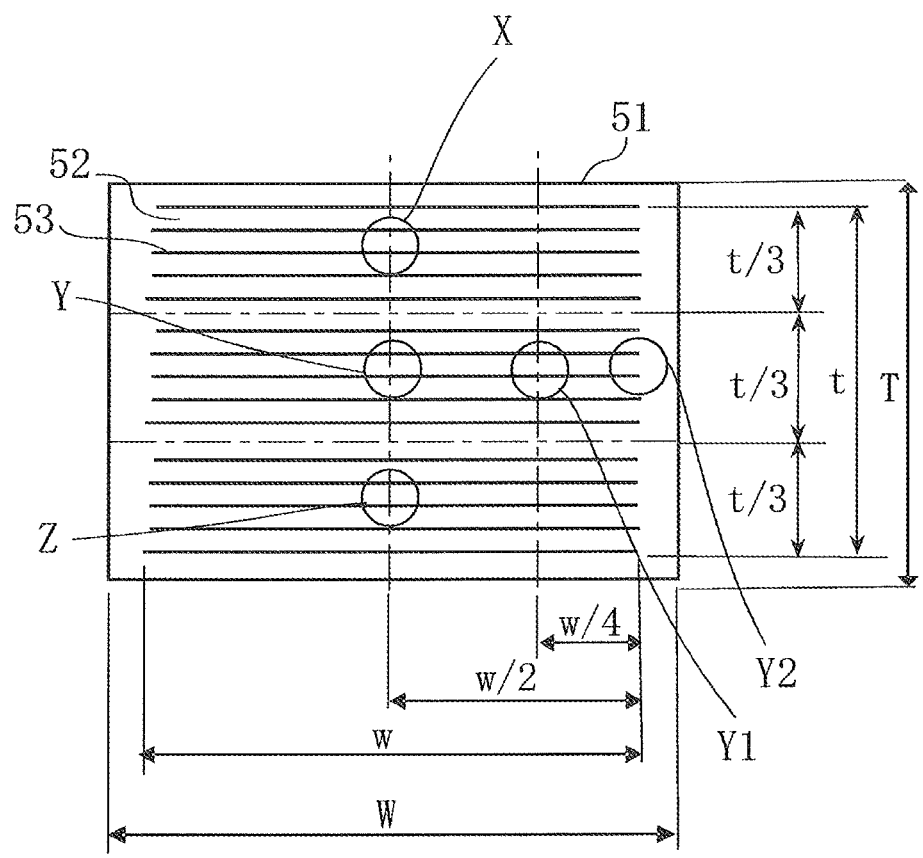
FIG. 2 is a transverse sectional view of a ceramic sintered body prepared according to an example.

FIG. 2 is a transverse sectional view of the ceramic sintered body, where a ceramic sintered body 51 has a width W (=1.6 mm) and a thickness T (=0.62 mm), and dielectric layers 52 of 2.0 μm in thickness and an internal electrode 53 of 0.6 μm in thickness are alternately laminated so that the effective number of dielectric layer 52 laminated is 200.

In a central part (w/2) with respect to the width w of internal electrode 53, the height t of the internal electrodes was divided into three equal parts, which were defined as an upper region X, a middle region Y, and a lower region Z. In addition, a part of the middle region Y near (w/4) in the horizontal direction was defined as a region Y1, and a tip (w=0) of internal electrode 53 in the middle region Y in the horizontal direction was defined as a side region Y2, and these five sites in total were subjected to mapping analysis of Zn and Ni.

As a result, Ni was detected in all of the upper region X, the middle region Y, the lower region Z, the region Y1, and the region Y2, and it has been confirmed that internal electrode 53 is formed in each of the regions. For each of these regions, whether Zn was detected or not was checked.

The respective samples of sample numbers 1 to 13 were subjected to a high-temperature load test, thereby figuring out the mean time to failure.

More specifically, a direct-current voltage of 20 V was applied to 10 samples for each sample number at a temperature of 175° C., the sample with an insulation resistance decreased to less than or equal to 10 kΩ was determined as a defective, and from the Weibull plot, the time to failure at 50% on the Weibull probability paper, that is, the mean time to failure was determined. It is to be noted that the sample with the mean time to failure of shorter than or equal to 100 hours was determined as a defective product.

Table 1 shows, for each of the samples of sample numbers 1 to 13, the Ba/Ti ratio, the Zn contents after the synthesis and after the firing treatment with respect to 100 parts by mole of Ti, the presence or absence of Zn in the inner electrode 53, and the mean time to failure.

In the column "Presence of Zn in Internal Electrode" in Table 1, the term "presence" indicates that Zn was detected from all of the regions mentioned above, whereas the term "absence" indicates that no Zn was detected from any of the regions.

TABLE 1

| Sample No. | Ba/Ti Ratio (—) | Zn Content with respect to 100 parts by mole of Ti (part by mole) | | Presence of Zn in Internal Electrode | Mean Time to Failure (h) |
|---|---|---|---|---|---|
| | | After synthesis (in ceramic raw material powder) | After firing treatment (in ceramic sintered body) | | |
| 1* | 1.01 | 0.010 | 0.010 | Absence | 11 |
| 2 | 1.01 | 0.10 | 0.010 | Presence | 210 |
| 3* | 1.01 | 0.033 | 0.033 | Absence | 5.6 |
| 4 | 1.01 | 0.15 | 0.032 | Presence | 290 |
| 5* | 1.03 | 0.066 | 0.066 | Absence | 3.3 |
| 6 | 1.03 | 0.30 | 0.058 | Presence | 270 |
| 7* | 1.03 | 0.10 | 0.10 | Absence | 2.5 |
| 8 | 1.03 | 0.40 | 0.089 | Presence | 220 |
| 9* | 1.04 | 0.15 | 0.15 | Absence | Less than 1 hour |
| 10 | 1.04 | 0.50 | 0.12 | Presence | 160 |
| 11* | 1.04 | 0.20 | 0.20 | Absence | Less than 1 hour |
| 12 | 1.04 | 0.60 | 0.18 | Presence | 130 |
| 13* | 1.04 | 1.5 | 0.30 | Presence | 18 |

*outside the scope of the present invention

In the case of sample numbers 1, 3, 5, 7, 9, and 11, without change in the Zn content with respect to 100 parts by mole of Ti between after the synthesis and after the firing treatment, and thus, Zn hardly volatilized even in the firing treatment under the reducing atmosphere, and moreover, no Zn was detected in the internal electrodes. For this reason, the mean time to failure is as short as less than 1 hour to 11 hours, which has proved to be inferior in reliability.

In the case of sample No. 13, due to the fact that the Zn content after the firing treatment is decreased to about ⅕ as compared with the Zn content after the synthesis, Zn volatilized in the firing treatment, and Zn was also detected from the internal electrodes, but the mean time to failure was as short as 18 hours. This is considered to be because it was not possible to form B site vacancies to the extent that the diffusion of oxygen vacancies can be suppressed, due to the fact that the Zn content was so high as 0.30 parts by mole with respect to 100 parts by mole of Ti even after the firing that Zn was excessively present at the B site, although Zn volatilized in the firing treatment.

In contrast, in the case of sample numbers 2, 4, 6, 8, 10, and 12, the Zn content after the firing is decreased as compared with the Zn content after the synthesis, and it has been determined that a certain amount of Zn is volatilized in the firing treatment. Further, the Zn content in ceramic sintered body 51 is 0.010 to 0.18 parts by mole with respect to 100 parts by mole of Ti, which meets greater than 0 parts by mole and less than or equal to 0.20 parts by mole, and Zn is thus detected even in internal electrodes 53. More specifically, the foregoing sample numbers 2, 4, 6, 8, 10, and 12 fall within the scope of the present invention, and it has been thus determined that the suppressed diffusion and migration of oxygen vacancies and the enhanced insulation at the interface between dielectric layers 52 and the internal electrodes act synergistically to improve the insulation performance, thereby providing multilayer ceramic capacitors that have favorable reliability with the mean time to failure of 130 to 270 hours.

In addition, the samples within the scope of the present invention has a Ba/Ti ratio from 1.01 to 1.04, which falls within the preferred range of the present invention, and it has been confirmed that the achievement of the Zn content and Zn fixing in the internal electrodes within the foregoing range provides multilayer ceramic capacitors with enhanced insulation and thus desired favorable reliability.

Multilayer ceramic capacitors are achieved which have high reliability with a favorable high-temperature load lifetime even in the case of continuous driving for a long period of time in a high-temperature atmosphere.

REFERENCE SIGNS LIST

1: Ceramic sintered body
2a to 2f: Internal electrode
6a to 6g: Dielectric layer

The invention claimed is:

1. A multilayer ceramic capacitor comprising:
a ceramic sintered body with alternately laminated dielectric layers and internal electrodes, wherein
each of the dielectric layers comprise a perovskite-type compound represented by a general formula $ABO_3$, and the perovskite-type compound contains at least Ti and a volatile element in a solid solution at a B site thereof,
each of the internal electrodes comprises a base metal material containing the volatile element, and
in the ceramic sintered body, a content of the volatile element is greater than 0 parts by mole and less than or equal to 0.2 parts by mole with respect to 100 parts by mole of a constituent element at the B site, excluding the volatile element at the B site.

2. The multilayer ceramic capacitor according to claim 1, wherein a ratio of a constituent element at an A site to the constituent element at the B site excluding the volatile element is 1.00 to 1.04 in terms of molar ratio.

3. The multilayer ceramic capacitor according to claim 1, wherein the volatile element contains at least one element selected from Zn, Sn, Sb, and In.

4. The multilayer ceramic capacitor according to claim 1, wherein the A site contains at least one element selected from Ba, Ca, and Sr.

5. The multilayer ceramic capacitor according to claim 1, wherein the B site contains Zr.

6. The multilayer ceramic capacitor according to claim 1, wherein the perovskite-type compound contains, as an accessory constituent, at least one element selected from a rare-earth element, a transition metal element, and Si, Cl or P.

7. The multilayer ceramic capacitor according to claim 6, wherein the rare earth element contains at least one element selected from the group of Gd, Dy, and Y.

8. The multilayer ceramic capacitor according to claim 6, wherein the transition metal element contains at least one element selected from the group of Mg, Al, Mn, Cu, and V.

9. The multilayer ceramic capacitor according to claim 1, wherein the perovskite compound is greater than 50 wt % of each of the dielectric layers.

10. The multilayer ceramic capacitor according to claim 1, wherein the perovskite compound is greater than or equal to 80 wt % of each of the dielectric layers.

11. The multilayer ceramic capacitor according to claim 1, wherein the perovskite compound is greater than or equal to 90 wt % of each of the dielectric layers.

12. A method for manufacturing a multilayer ceramic capacitor, the method comprising:
a ceramic raw material powder containing at least Ti and a volatile compound containing a volatile element;
forming the ceramic raw material powder into a plurality of ceramic green sheets;
applying a conductive paste onto each of the plurality of ceramic green sheets in the form of an electrode pattern, the conductive paste containing a base metal material as a main constituent thereof;
stacking the plurality of green sheets having the electrode pattern thereon to form a ceramic laminated body; and
firing the ceramic laminated body in a reducing atmosphere so as to form a ceramic sintered body with alternately laminated dielectric layers and internal electrodes, wherein
each of the dielectric layers comprise a perovskite-type compound represented by a general formula $ABO_3$, and the perovskite-type compound contains at least the Ti and the volatile element is in a solid solution at a B site thereof,
each of the internal electrodes comprises the base metal material and contains the volatile element, and
in the ceramic sintered body, a content of the volatile element is greater than 0 parts by mole and less than or equal to 0.2 parts by mole with respect to 100 parts by mole of a constituent element at the B site, excluding the volatile element at the B site.

13. The method for manufacturing a multilayer ceramic capacitor according to claim 12, wherein the volatile element contains at least one element selected from Zn, Sn, Sb, and In.

14. The method for manufacturing a multilayer ceramic capacitor according to claim 12, wherein the A site contains at least one element selected from Ba, Ca, and Sr.

15. The method for manufacturing a multilayer ceramic capacitor according to claim 12, wherein the B site contains Zr.

16. The method for manufacturing a multilayer ceramic capacitor according to claim 12, wherein the ceramic raw material powder contains, as an accessory constituent, at least one compound selected from a rare-earth compound, a transition metal compound, and Si, Cl or P compounds.

17. The method for manufacturing a multilayer ceramic capacitor according to claim 16, wherein the rare earth compound contains at least one element selected from the group of Gd, Dy, and Y.

18. The method for manufacturing a multilayer ceramic capacitor according to claim 16, wherein the transition metal compound contains at least one element selected from the group of Mg, Al, Mn, Cu, and V.

19. The method for manufacturing a multilayer ceramic capacitor according to claim 12, wherein the reducing atmosphere is composed of a $H_2$—$N_2$—$H_{20}$ gas with an oxygen partial pressure of $10^{-11}$ to $10^{43}$ MPa.

20. The method for manufacturing a multilayer ceramic capacitor according to claim 12, wherein the firing is conducted at a temperature of 1200 to 1300° C.

* * * * *